(12) United States Patent
Loffink et al.

(10) Patent No.: US 7,467,283 B2
(45) Date of Patent: Dec. 16, 2008

(54) SYSTEM AND METHOD FOR ADDRESSING PROTOCOL TRANSLATION IN A STORAGE ENVIRONMENT

(75) Inventors: John S. Loffink, Austin, TX (US); Jason Lau, Austin, TX (US); Arthur J. Gregorcyk, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/103,663

(22) Filed: Apr. 12, 2005

(65) Prior Publication Data

US 2005/0216604 A1 Sep. 29, 2005

Related U.S. Application Data

(62) Division of application No. 10/316,366, filed on Dec. 11, 2002, now abandoned.

(51) Int. Cl.
*G06F 12/10* (2006.01)
*G06F 12/00* (2006.01)
*G06F 13/00* (2006.01)

(52) U.S. Cl. .................... 711/202; 711/1; 711/100; 711/111; 711/112; 711/200; 710/3; 710/9

(58) Field of Classification Search .............. None
See application file for complete search history.

(56) References Cited

U.S. PATENT DOCUMENTS

| | | | |
|---|---|---|---|
| 5,974,502 A | 10/1999 | DeKoning et al. | 711/114 |
| 6,000,020 A | 12/1999 | Chin et al. | 711/162 |
| 6,098,114 A | 8/2000 | McDonald et al. | 710/5 |
| 6,098,129 A | 8/2000 | Fukuzawa et al. | 710/65 |
| 6,105,122 A | 8/2000 | Muller et al. | 712/1 |
| 6,134,630 A | 10/2000 | McDonald et al. | 711/114 |
| 6,138,176 A | 10/2000 | McDonald et al. | 710/6 |
| 6,247,077 B1 | 6/2001 | Muller et al. | 710/74 |
| 6,256,740 B1 | 7/2001 | Muller et al. | 713/201 |
| 6,301,625 B1 | 10/2001 | McDonald et al. | 710/5 |
| 6,304,942 B1 * | 10/2001 | DeKoning | 711/114 |
| 6,385,683 B1 | 5/2002 | DeKoning et al. | 710/261 |
| 6,421,760 B1 | 7/2002 | McDonald et al. | 711/114 |
| 6,484,235 B1 | 11/2002 | Horst et al. | 711/114 |
| 6,549,977 B1 | 4/2003 | Horst et al. | 711/113 |
| 6,549,981 B2 | 4/2003 | McDonald et al. | 711/114 |
| 6,567,892 B1 | 5/2003 | Horst et al. | 711/114 |
| 6,862,648 B2 * | 3/2005 | Yatziv | 710/315 |
| 6,925,519 B2 * | 8/2005 | Day et al. | 710/315 |
| 6,996,642 B2 * | 2/2006 | Apperley et al. | 710/74 |
| 2003/0145179 A1 * | 7/2003 | Gabber et al. | 711/162 |
| 2003/0184902 A1 | 10/2003 | Thiesfeld | 360/48 |
| 2004/0003124 A1 | 1/2004 | Odenwald et al. | 709/249 |
| 2004/0010660 A1 | 1/2004 | Konshak et al. | 711/114 |
| 2004/0019734 A1 | 1/2004 | Day et al. | 710/315 |
| 2004/0044705 A1 * | 3/2004 | Stager et al. | 707/204 |

* cited by examiner

*Primary Examiner*—Tanh Q Nguyen
(74) *Attorney, Agent, or Firm*—Baker Botts L.L.P.

(57) ABSTRACT

A system and method for translating addressing protocols between two types of storage drives in a storage environment is provided. A storage environment may include a JBOD of Serial ATA drives coupled to a host server through an external SCSI connection. The addressing protocol of the host server will typically involve addressing each Serial ATA drive by a unique SCSI target ID. This addressing protocol of the host server is translated to an addressing protocol in which each Serial ATA drive is addressed through unique LUN identifier and a single SCSI target ID, which is the addressing scheme of some SCSI-based peripheral controllers.

2 Claims, 2 Drawing Sheets

SYSTEM AND METHOD FOR ADDRESSING PROTOCOL TRANSLATION IN A STORAGE ENVIRONMENT

This application is a division of abandoned U.S. application Ser. No. 10/316,366, filed Dec. 11, 2002.

TECHNICAL FIELD

The present disclosure relates generally to the field of external storage systems and networks, and, more particularly, to a system and method for translating addressing protocols between two types of storage devices in a storage environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a Serial ATA Interface as a storage interface. Serial ATA was developed as a replacement for Parallel ATA as a storage interface for desktop and portable computer systems. The Serial ATA Interface offers a number of advantages over the Parallel ATA Interface, including a reduction in signaling voltages and required pin count, an elimination of a cable length limitation, and improved data robustness. To this time, however, the Serial ATA standard does not provide for external cabling. As such, for external storage systems, another interface, such as SCSI, must be used for the connection between the host adapter and the external storage subsystem.

An external storage subsystem may be configured to include, for example, a host adapter in a server that is coupled via a SCSI connection to a JBOD (just a bunch of drives) enclosure. Current solutions with either Parallel ATA drives or Serial ATA drives in a JBOD enclosure poorly emulate the use of SCSI drives in a JBOD. In the case of Parallel ATA drives in a JBOD, the entire enclosure of Parallel ATA drives is instantiated as one or two SCSI target IDs. Although some bridge devices have been developed that use LUN (logical unit number) identification to map SCSI target IDs to Parallel ATA drives, this solution is likewise problematic in that a typical RAID controller will only recognize the first one to eight LUNs of the JBOD enclosure, even though the SCSI protocol permits a maximum of 64 LUNs per target controller. This configuration, using Parallel ATA drives, may similarly be applied to Serial ATA drives, but does not take advantage of the benefits of the existing SCSI infrastructure of storage management and RAID controllers.

In a JBOD enclosure having Serial ATA drives behind a SCSI target interface, assigning each drive its own SCSI ID may not be an achievable solution with the use of known storage management architectures. Because the target controller of the JBOD enclosure typically responds to only a single SCSI ID, regardless of the number of Serial ATA drives, transparently replacing SCSI drives with Serial ATA drives with the goal of mapping the Serial ATA drives in a JBOD enclosure according to a unique SCSI ID is problematic. Likewise, assigning each Serial ATA drive its own LUN identifier and mapping to each Serial ATA drive on the basis of its LUN identifier would not provide a transparent solution for replacing SCSI drives with Serial ATA drives, as existing RAID controllers and storage management are not configured to map to drives in this manner.

SUMMARY

In accordance with the present disclosure, a method and system is provided for translating the SCSI addressing scheme for external storage environments to accommodate the placement of Serial ATA drives in a JBOD enclosure. Serial ATA drives may be placed in a JBOD enclosure, with each being assigned a target ID. In one embodiment of the present disclosure, each JBOD enclosure includes a multi-target bridge or buffer device that recognizes SCSI communications that include a SCSI target ID that is associated with a Serial ATA drive in the JBOD enclosure. The multi-target bridge or buffer routes the communication to a processor or other device that translates the message from the SCSI protocol to the Serial ATA protocol. In another embodiment of the present disclosure a translation or bridge device is placed between a host, which typically seeks to address each Serial ATA drive by a unique SCSI target ID, and a JBOD enclosure having a SCSI peripheral controller, which typically seeks to address each drive by a single target ID and a unique LUN identifier. The translation or bridge device maps communications from the target ID-based addressing scheme to the JBOD enclosure's LUN-based addressing scheme.

One technical advantage of the present disclosure is a storage environment in which SCSI drives can be replaced by Serial ATA drives, making it possible to create a class of external storage enclosures that are less expensive than traditional SCSI-based ones and that do not require a rewrite of the addressing scheme of the host controller or the peripheral controller. Another technical advantage of the present disclosure is a storage environment in which the use of Serial ATA drives in an external storage device is transparent to the host server. The host server will typically attempt to address each Serial ATA drive by a unique target ID. The technique of the present invention involves the translation of the addressing scheme of the host server to an addressing scheme involving the use of unique LUN identifiers, together with a single target ID for each set of storage drives. The latter addressing protocol is recognized by the peripheral controllers of the external storage devices. Another technical advantage of the present invention involves the configuration of a storage environment in which can include SCSI external connections and Serial ATA drives in the external storage devices. The addressing protocol translation scheme disclosed herein provides for a method of integrating the reliability benefits of an external SCSI connection with the cost and performance benefits of Serial ATA drives. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure concerns a storage environment for use in an information handling system in which Serial ATA drives, or any other drive requiring a unique SCSI ID, may be used as transparent replacements for traditional SCSI drives. The present invention provides a method and network for translating between SCSI addressing protocols. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
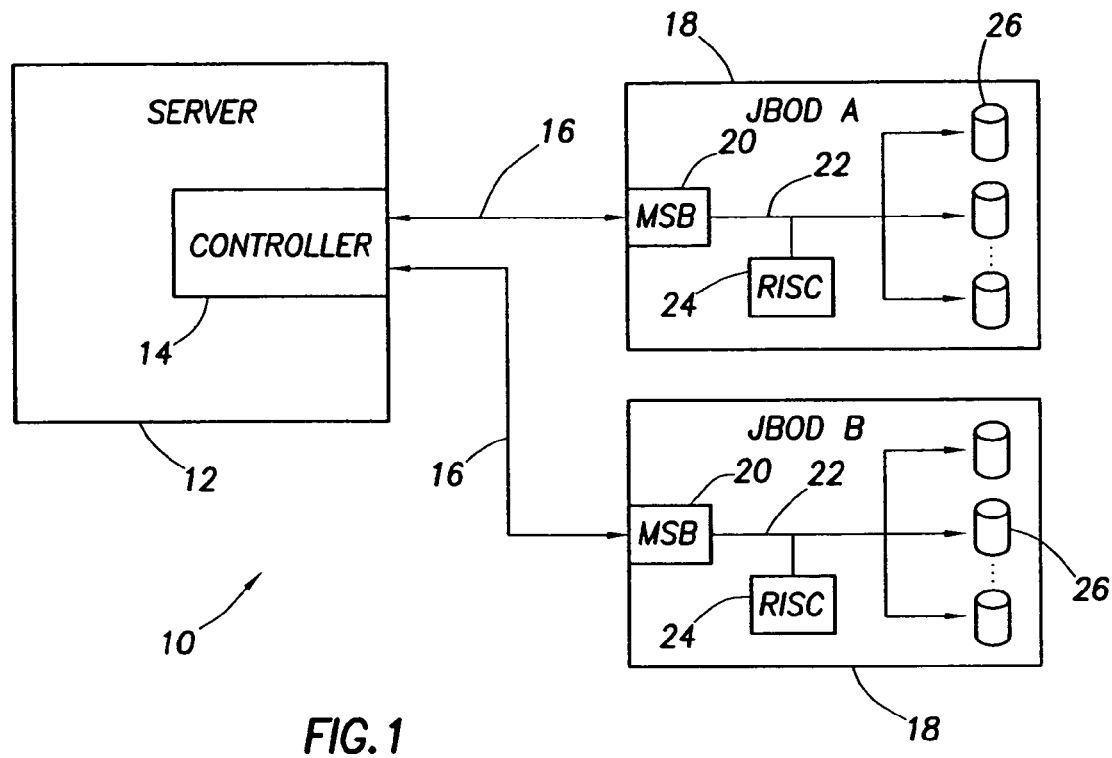
FIG. 1 is a diagram of a storage environment that includes a multi-target SCSI bridge in a JBOD enclosure.

Shown in FIG. 1 a storage environment, which is indicated generally at 10. Included in the storage environment is a storage server 12 that is individually coupled through SCSI connection 16 to two JBOD enclosures 18. Server 12 includes a controller 14, which may be a RAID controller or another form of a host adapter. JBOD enclosure 18 includes a multi-target SCSI bridge (MSB) that is coupled via a PCI bus 22 to a RISC processor 24. Also coupled to PCI bus 22 are a plurality of Serial ATA controllers 26. In this configuration, each Serial ATA drive is logically assigned its own SCSI ID identifier. Multi-target SCSI bridge 20 is able to recognize those SCSI IDs that are assigned to the Serial ATA drives of the JBOD. As an example, the Serial ATA drives of the JBOD enclosure that is labeled JBOD A may be assigned Channel A SCSI IDs 0-15, and the Serial ATA drives of the JBOD enclosure that is labeled JBOD B may be assigned Channel B SCSI IDs 0-15.

Once the multi-target SCSI bridge 20 of JBOD A recognizes a communication to SCSI ID 0 through SCSI ID 15, multi-target SCSI bridge 20 pass those communications through PCI bus to RISC processor 24, which performs the protocol translation from the SCSI protocol to the Serial ATA protocol. The communication is then passed to the Serial ATA drive having the SCSI ID that has been logically assigned to the device. It should be recognized that storage environment disclosed herein need not necessarily include a RISC processor. Instead, any processor or processing device suitable for performing the translation from the SCSI protocol to the Serial ATA protocol is suitable. Because the use of the multi-target SCSI bridge is transparent to the controller 14, the presence of JBOD enclosures having Serial ATA drives does not change the addressing protocol of the RAID controller. A RAID controller can address each Serial ATA drive with a unique SCSI ID. The ability of a multi-target SCSI bridge in each JBOD to capture communications to a range of SCSI IDs permits the use of Serial ATA drives in a JBOD without changing the SCSI storage management protocol used for the connections between the storage server and the external storage devices in the storage environment.

Figure 2:
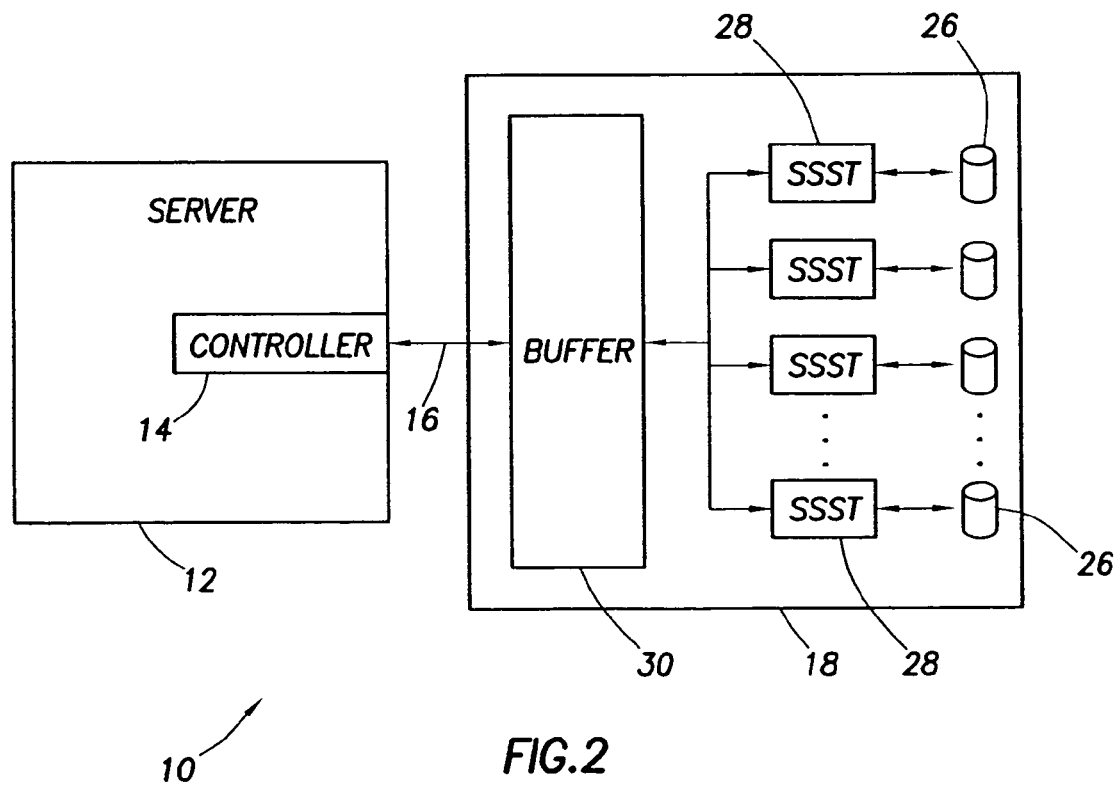
FIG. 2 is a diagram of a storage environment that includes a buffer and a plurality of single SCSI to Serial ATA translation devices.

Shown in FIG. 2 is a diagram of a storage environment 10 that includes a server 12 and a JBOD enclosure 18. Server 12 includes a controller 14, which may be a RAID controller or another form of a host adapter, is connected via a SCSI connection 16 to a JBOD enclosure 18. JBOD enclosure 18 may include a buffer 30 that is coupled to several Single SCSI to Serial ATA Translation (SSST) devices 28. In the storage environment or FIG. 2, each SSST device 28 is coupled between buffer 30 and a single Serial ATA drive 26. In one configuration, JBOD enclosure 18 may include as many as fifteen individual pairs of SSST devices and Serial ATA drives 26. Each Serial ATA drive 26 is assigned a SCSI ID. In this configuration, each SSST 28 emulates a normal SCSI device, responding to it's assigned SCSI ID, translating the communication from SCSI to SATA protocol, and routing the communication to it's corresponding SATA drive 26.

Although the SSST devices 28 of FIG. 2 are shown as individual devices, SSST devices 28 and buffer 30 may be combined into one or more application specific integrated circuits (ASICs). Like the configuration of the storage environment of FIG. 1, the configuration of the storage environment of FIG. 2 is transparent to the operation of controller 14. Controller 14 is able to address each Serial ATA drive according to a unique SCSI ID. In this configuration, controller 14 is able to address each of the Serial ATA drives by the SCSI ID assigned to the drives and without the necessity of converting SCSI IDs to LUN identifiers.

Figure 3:
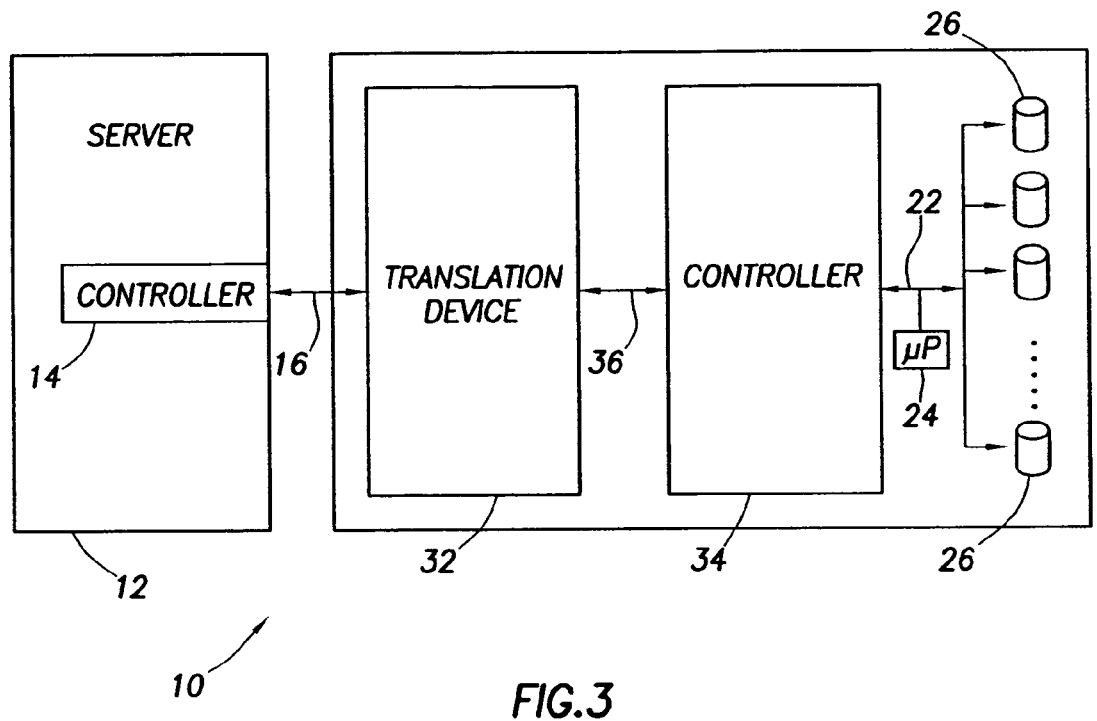
FIG. 3 is a diagram of storage environment that includes translation device coupled between a host server and a JBOD enclosure.

Shown in FIG. 3 is a diagram of a storage environment 10 that includes a host server 12, a controller 14, which may be a RAID controller or another form of a host adapter. An external SCSI connection 16 couples controller 14 to a JBOD enclosure 18. Included in JBOD enclosure 18 is a translation device 32, which is coupled through a SCSI connection 36 to a target controller 34. Target controller 34 is coupled to a plurality of Serial ATA drives 26 through a PCI bus 22. Included on the PCI bus 22 is a microprocessor, which performs the protocol translation between the SCSI protocol and the Serial ATA protocol.

Figure 4:
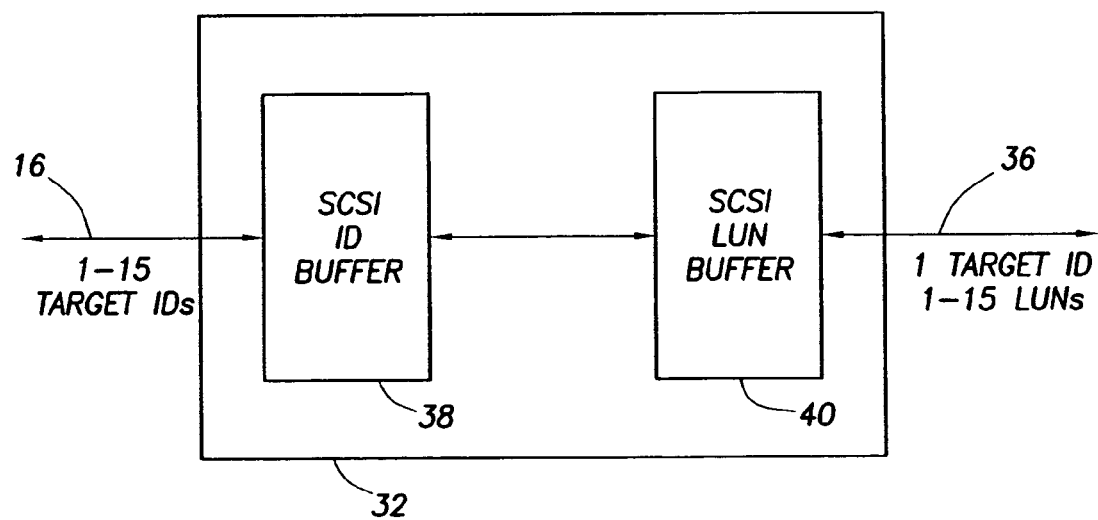
FIG. 4 is a block diagram of the translation device of FIG. 4 and its connections to the storage environment.

The operation of translation device 32 is described in more detail in FIG. 4. The function of translation device 32 is to receive addressing instructions from server 12 and controller 14 in which each storage device is assigned its own SCSI ID and to convert this addressing protocol to an addressing scheme in which devices are identified to the target controller as unique LUN number with a single SCSI ID. In this manner, each Serial ATA drive can be uniquely addressed within a single JBOD enclosure without altering the addressing scheme of either the host controller or the peripheral controller. From the perspective of the peripheral controller, each Serial ATA drive is assigned its own target ID. As such, the addressing protocol from the host controller on SCSI connection 16 involves an addressing scheme of multiple target IDs. In the example of FIG. 4, fifteen target IDs, numbered 1-15, are used. Translation device 32 at SCSI ID buffer (SIB) 38 receives from the host controller communications addressed according to the target ID addressing scheme. This communication is then passed to the SCSI LUN buffer (SLB) 40, which translates the target ID addressing scheme to a LUN addressing scheme in which all target IDs are grouped under a single target ID having unique LUN identifiers. The communication is then translated to the peripheral controller on SCSI connection 36. The peripheral controller of the JBOD enclosure then maps the communication to the appropriate Serial ATA drive. The translation of the communication from the SCSI protocol to the Serial ATA protocol is performed by microprocessor 24.

In the storage environment of FIG. 3 and FIG. 4, it may be necessary to employ an out-of-band interface between SCSI LUN buffer 40 and SCSI controller 34. When a translation is made in the direction from the Serial ATA drives to the host server, LUN identifier information may be transferred on SCSI connection 36 at a time when it cannot be timely handled by SCSI LUN buffer 40 for translation to SCSI ID buffer 38. An out-of-band interface between SCSI LUN buffer 40 and SCSI controller 34 would provide the transfer of LUN data in a timely manner to meet the SCSI bus arbitration timing requirements at the SCSI ID buffer. If the timing of the SCSI LUN buffer 40 were improved, it may be possible to eliminate any need for an out-of-band interface between the SCSI LUN buffer 40 and SCSI controller 34.

As an alternative to a physical translation device, the translation device of FIG. 3 and FIG. 4 could be implemented in firmware of the host controller 14. The firmware of the host controller could be modified to communicate with multiple LUNs under a single ID, even though the controller 14 presents to higher logical levels of firmware in the controller that the controller should be addressed according to a multiple SCSI ID addressing scheme.

It should be recognized that the method and storage environment described in the present disclosure is not limited in its application to storage devices that include Serial ATA drives. Rather, the techniques of the present disclosure would apply to any storage environment in which there is a need to translate between addressing schemes, including translation between a SCSI target ID-based addressing scheme and a SCSI LUN-based addressing scheme. Although the present disclosure has been described in detail, it should be understood that various changes, substitutions, and alterations can be made hereto without departing from the spirit and the scope of the invention as defined by the appended claims.

The invention claimed is:

1. A storage network, comprising:
 a host having a host controller, wherein the host controller addresses a storage drive in the storage network according to a first communications protocol; and
 a storage device coupled to the host through a SCSI network connection, the storage device comprising:
  a plurality of storage drives communicating through a second communications protocol;
  a single peripheral controller controlling the plurality of storage drives; and
  a single translation device coupled between the host controller and the single peripheral controller, wherein the single translation device is operable to translate communications in the first communications protocol to communications in the second communications protocol, and wherein the single translation device comprises a buffer for receiving communications to and from the host;
 wherein an addressing scheme of the host controller needs not be altered due to the use of the second communications protocol and an addressing scheme of the single peripheral controller needs not be altered due to the use of the first communications protocol,
 wherein addressing in the first communications protocol comprises addressing the plurality of storage drives by unique SCSI target IDs, with each unique SCSI target ID being assigned to a corresponding unique storage drive of the plurality of storage drives, and
 wherein addressing in the second communications protocol comprises addressing the plurality of storage drives using unique SCSI LUN numbers and a single SCSI target ID, with each unique SCSI LUN number being assigned to a corresponding unique storage drive of the plurality of storage drives and the single SCSI target ID being assigned to the plurality of storage drives.

2. The storage network of claim 1,
 wherein the storage device is a JBOD enclosure; and
 wherein the plurality of storage drives comprises Serial ATA drives.

* * * * *